(12) United States Patent
Nilsson et al.

(10) Patent No.: US 7,800,528 B2
(45) Date of Patent: Sep. 21, 2010

(54) RADAR LEVEL GAUGE WITH VARIABLE PULSE PARAMETERS

(75) Inventors: Valter Nilsson, Hovås (SE); Anders Jirskog, Huskvarna (SE); Niklas Penndal, Jönköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 11/831,053

(22) Filed: Jul. 31, 2007

(65) Prior Publication Data

US 2009/0033543 A1    Feb. 5, 2009

(51) Int. Cl.
*G01F 23/284* (2006.01)
*G01S 13/08* (2006.01)

(52) U.S. Cl. .................. 342/124; 342/82; 342/137; 342/202; 73/290 R

(58) Field of Classification Search ............. 342/124, 342/137, 73, 82–87, 118, 134, 165, 173–174, 342/202–204; 73/290 R
See application file for complete search history.

(56) References Cited

U.S. PATENT DOCUMENTS

| | | | | |
|---|---|---|---|---|
| 3,296,862 A * | 1/1967 | Ziniuk | ...................... | 73/290 R |
| 3,739,379 A * | 6/1973 | Davis | ........................... | 342/88 |
| 3,946,322 A | 3/1976 | Katz | ........................... | 328/58 |
| 3,985,030 A * | 10/1976 | Charlton | ................... | 73/290 V |
| 4,001,821 A | 1/1977 | Nelson | ........................... | 343/5 |
| 4,984,449 A * | 1/1991 | Caldwell et al. | ............. | 73/49.2 |
| 6,995,706 B2 * | 2/2006 | Ohlsson | ....................... | 342/124 |
| 7,477,182 B2 * | 1/2009 | Ikeda | .......................... | 342/92 |
| 2006/0055591 A1 | 3/2006 | Eriksson | ..................... | 342/124 |

FOREIGN PATENT DOCUMENTS

| | | |
|---|---|---|
| JP | 02-275381 | 11/1990 |
| JP | 05-297132 | 11/1993 |
| JP | 07-092252 | 4/1995 |

* cited by examiner

*Primary Examiner*—Thomas H Tarcza
*Assistant Examiner*—Cassi Galt
(74) *Attorney, Agent, or Firm*—Westman, Champlin & Kelly, P.A.

(57) ABSTRACT

A radar level gauge (RLG) system and method for determining a filling level of a filling material in a tank is disclosed. The RLG system comprises a transmitter for generating and transmitting an electromagnetic transmitter pulse signal, a transmitter controller for controlling means for pulse width adjustment for adjusting the pulse width of the transmitter pulse signal in dependence of at least one application specific condition. Further, the system comprises a signal medium interface connectable to means for directing said transmitter pulse signal towards said filling material and for receiving a reception pulse signal reflected back from said filling material; a receiver for receiving said reception pulse signal from the tank; and processing circuitry for determining the filling level of the tank based on said reflection pulse signal received by said receiver. The application specific condition(s) is e.g. one or several of tank height, level of the filling material, type of filling material, presence of other tank structure providing reflecting surfaces and required accuracy of measurement.

14 Claims, 4 Drawing Sheets

RADAR LEVEL GAUGE WITH VARIABLE PULSE PARAMETERS

FIELD OF THE INVENTION

The present invention relates to a pulsed radar level gauge system and a corresponding method.

BACKGROUND OF THE INVENTION

Radar level gauging (RLG) to measure the level of a filling material, such as a liquid or a solid like a granulate is an increasingly important method for level gauging in tanks, containers, etc. In RLG, continuously emitted radiation, and in particular FMCW, is used for most applications. However, pulsed RLG is becoming a more widely spread method for industrial level gauging, due to its simple and cost effective microwave components. The pulse in a pulsed RLG can be modulated by a carrier frequency, typically 6 or 24 GHz, or be an unmodulated DC pulse. In the latter case, it is common to use some kind of transmission line, such as a coaxial line, twin line, etc., sometimes referred to as a probe, in order to guide the electro-magnetic signal through the material in the tank where it is reflected by one or more interface surfaces (such as air/liquid) between different parts of the tank content. In the former case a transmission line or wave guide can also be used, but generally an antenna is used to freely emit radiation in the form of a vertical radar beam which is reflected at possible interface surfaces.

However, pulsed radars typically have lower sensitivity compared to frequency modulated continuous wave (FMCW) radar. The sensitivity, i.e. the ability to detect weak reflections, is an important virtue for any RLG as a high sensitivity may enable the use of a smaller antenna or a longer transmission line, all other parameters held constant. Accordingly, various attempts have been made to improve the sensitivity of pulsed RLG systems. For example, US 2006/0055591 by the same applicant discloses an improved type of directional coupler, providing increased sensitivity to the system.

However, there is still a need for alternative or additional means for improving the sensitivity of pulsed RLG systems.

SUMMARY OF THE INVENTION

It is therefore an object of the present invention to provide an improved radar level gauge system and method which at least partly alleviate the above-discussed problems of the prior art.

This object is achieved with the radar level gauge and method according to the appended claims.

According to a first aspect of the invention, there is provided a method for determining a filling level of a filling material in a tank, comprising the steps:

providing a pulse generator for generation of electromagnetic pulses;

controlling the pulse width of generated pulses in dependence of at least one application specific condition;

transmitting said pulses with adjusted pulse width towards said filling material;

receiving reflected echo pulse signals from the tank; and determining the filling level of the tank based on said received echo pulse signals.

The application specific condition may be a static or dynamic condition, such as one or several of tank height, level of the filling material, type of filling material, presence of other tank structure providing reflecting surfaces and required accuracy of measurement.

By means of this pulse width adjustment, it becomes possible to obtain an optimized balance between signal strength of the received reflected signals and the ability of detecting relatively weak reflections on the one hand, and resolution between different reflected signals on the other hand. The theoretical background for this is explained in more detail in the following. Hence, the present invention is particularly advantageous for applications where several levels are to be measured, e.g. due to several different material interfaces in the tank.

The present invention e.g. enables automated production tests, since the pulse width can be changed during operation, without specific tools etc. Further, the pulse width adjustment functionality can be used in a system where the pulse width is continuously controlled in order to achieve an optimized map of resolution and sensitivity, and for obtain an optimized choice of the pulse width. For example, this allows targets of interest that provide weak echoes to be emitted with more energy, and vice versa. Targets that are close in terms of distances, can be better distinguished if the pulse width is shortened. In accordance with the invention, the system functionality can be made adaptive, in order to obtain an optimized resolution/sensitivity at all times, and for all types of application conditions.

Thus, one advantageous way of using the present invention is to provide an easy adaptation of the pulse width of a general radar level gauge system to a known measuring situation, wherein fixed settings may be used.

Another advantageous way of using the present invention is to provide automatic and/or adaptive control, by means of e.g. scanning the total range or a sub-range of the levels of the tank width different pulse widths, in order to find an optimal choice for a specific situation. The control of the pulse width can be linear or stepwise, e.g. for a number of certain typical situations. Automatic control of the pulse width may also be based on measurements related to the specific conditions at hand.

Preferably, the pulse width adjustment comprises the sub-steps of: controlling the pulse width to at least two different widths; determining the filling level of the tank based on said received echo pulse signals using each of said different pulse widths; and selecting, based on said determinations of the filling level, one of said pulse widths to be used for subsequent filling level determination. Most preferably, a scanning is made with a multitude of different pulse widths. Hereby, the most suitable pulse width can be selected in an automatic fashion. For example, this enables an initial scanning of the tank with a relatively large pulse width, in order to obtain a general overview of where the surface interfaces etc are. Thereafter, narrower pulses can be selected, at least for specific level ranges, in order to obtain an optimized resolution. Thus, the scanning preferably involves a multifold repetition over time of the steps of controlling the pulse width and determining the filling level for each of said different pulse widths, where after a pulse width optimized for the present conditions can be selected.

Alternatively, the pulse width of generated pulses in accordance with at least one application specific condition comprises the further steps: controlling the pulse width of generated pulses to be a first pulse width; transmitting said pulses having said first pulse width towards said filling material; receiving reflected echo pulse signals from the tank; and determining a first measure of the filling level of the tank based on said received echo pulse signals; and determining a second pulse width to be used for subsequent pulses based on said first measure of the filling level. In this way, a suitable pulse width can also be determined automatically. Preferably, the pulse width is decreased in continuous or incremental steps, wherein said first pulse width is longer than said second pulse width.

The pulse is preferably a modulated pulse, even though non-modulated pulses are also feasible.

According to another aspect of the present invention there is provided a radar level gauge system for determining a filling level of a filling material in a tank, comprising:

a transmitter for generating and transmitting an electromagnetic transmitter pulse signal, wherein the transmitter comprises a pulse generator and means for pulse width adjustment;

a transmitter controller for controlling the means for pulse width adjustment for adjusting the pulse width of the transmitter pulse signal in dependence of at least one application specific condition;

a signal medium interface connectable to means for directing said transmitter pulse signal towards said filling material and for receiving a reception pulse signal reflected back from said filling material;

a receiver for receiving said reception pulse signal from the tank; and processing circuitry for determining the filling level of the tank based on said reflection pulse signal received by said receiver.

In accordance with this aspect, similar advantages and preferred features are obtainable as have already been discussed with respect to the first aspect.

These and other aspects of the invention will be apparent from and elicited with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DESCRIPTION OF PREFERRED EMBODIMENTS

Figure 1A:
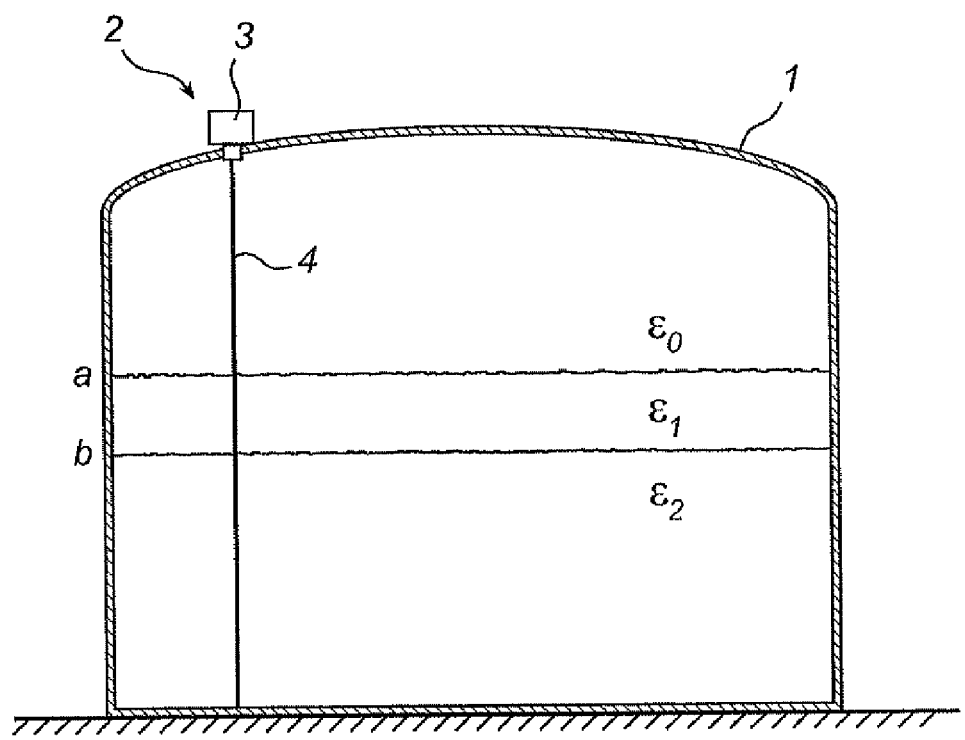
FIG. 1a is a schematic cross-sectional side view of a container, in which a radar level gauge system using probe wave guide according to another embodiment of the invention is arranged.
Figure 1B:
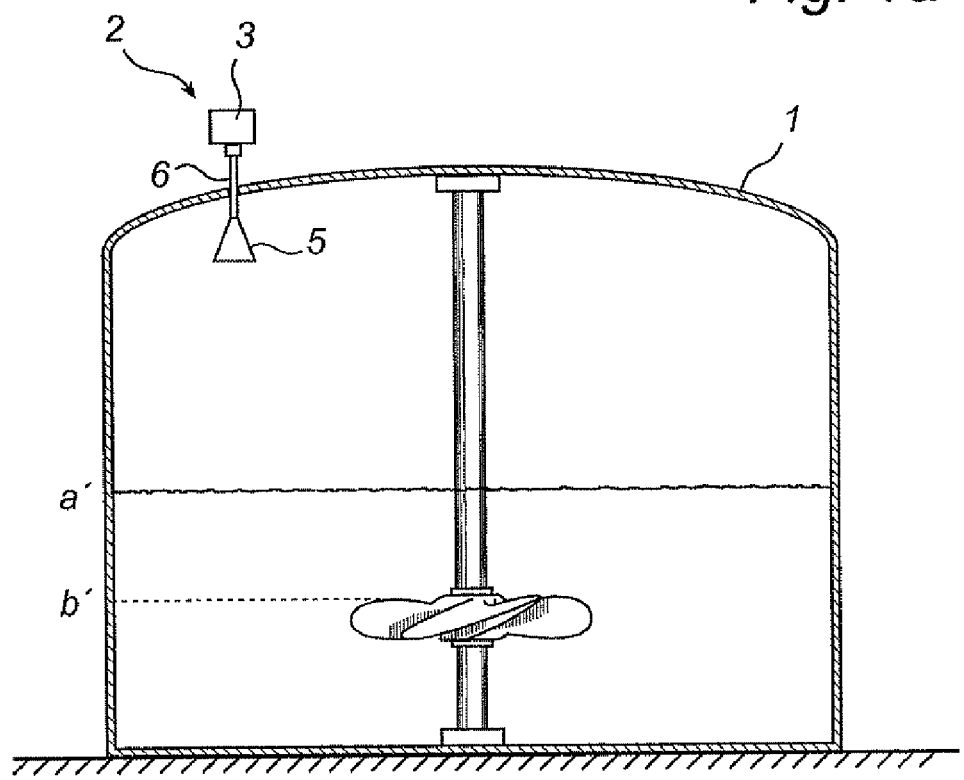
FIG. 1b is a schematic cross-sectional side view of a container, in which a radar level gauge system using a transmitting antenna according to one embodiment of the invention is arranged.

FIGS. 1a and 1b show schematically a radar level gauge (RLG) system 2 according to the present invention. As is discussed in more detail in the following, the radar level gauge system comprises an electronic unit 3 for transmitting and receiving radar signals and processing the received signals in order to determine the level of a filling material in the tank 1. Specifically, the system 2 is arranged to perform measurements of one or several level of a filling material, such as the level of an interface between two (or more) materials in the tank. Typically, the first material is a content stored in the tank, e.g. a liquid such as gasoline, while the second material is air or some other atmosphere. In that case, the RLG will enable detection of the level of the surface of the content in the tank. Notably, different tank content have different impedance, and the electromagnetic waves will not propagate through any material in the tank. Typically, therefore, only the level of a first liquid surface is measured, or a second liquid surface if the first liquid is sufficiently transparent.

Figure 4:
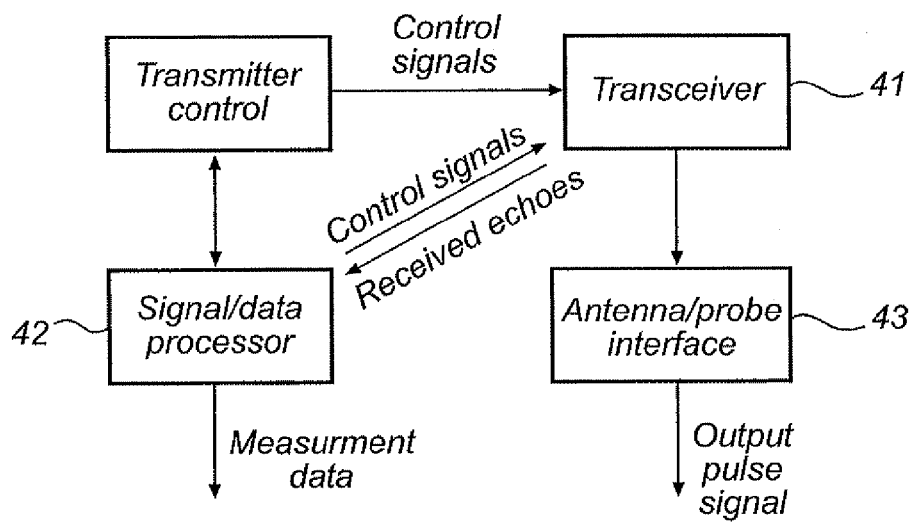
FIG. 4 is a block diagram schematically illustrating the electronic unit of the RLG systems of FIGS. 1a and b.

Referring now to FIG. 4, the RLG system 2 comprises a transceiver 41, controlled by a processor 42 to transmit electromagnetic signals to a signal medium interface 43 in the tank.

Figure 3A:
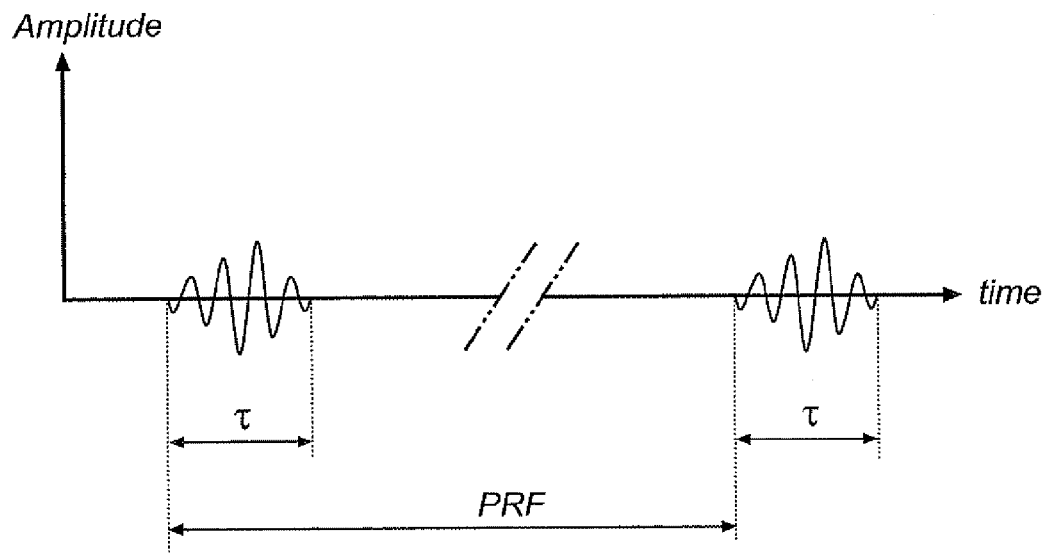
FIGS. 3a and 3b schematically illustrate a pulsed transmitter signal using pulses modulated on a carrier wave and DC pulses, respectively.
Figure 3B:
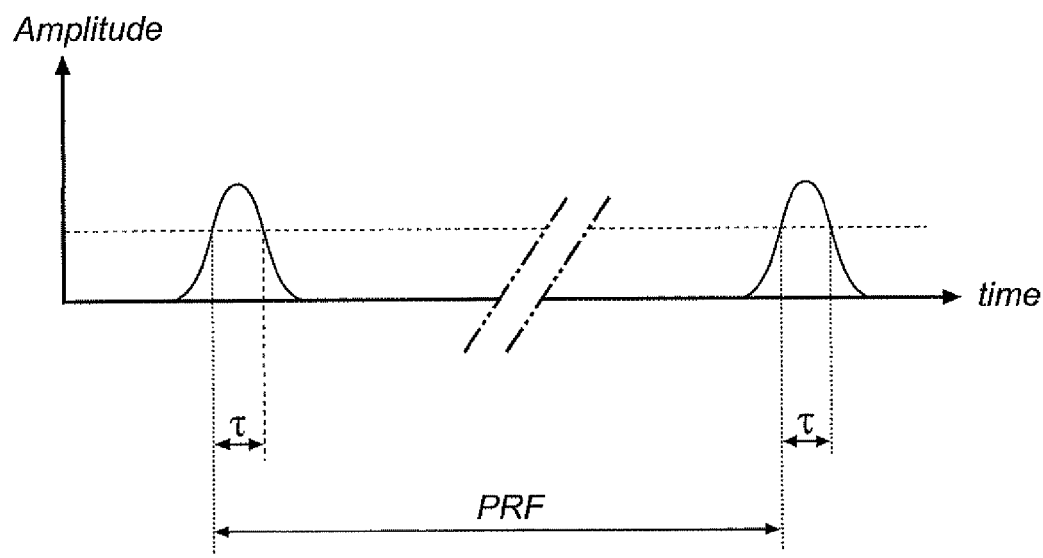

The signals can be DC pulses, as illustrated in FIG. 3b, with a pulse width $\tau$, i.e. a length in time, which is preferably about 2 ns or less. The pulses are repeated with a frequency in the order of MHz, at average power levels in the mW or μW area, and the timely separation between the start of two sequential pulses, denoted PRF in the drawings, is significantly longer than the pulse width $\tau$. Alternatively, the pulses can be modulated on a carrier wave, preferably of a GHz frequency, as is illustrated in FIG. 3a.

The transceiver 41 can comprise various components, as is per se known in the art. E.g. the transceiver circuit can comprise separate receiver and transmitter circuits, or a common transceiver circuit. Further, the transceiver preferably comprises a transmit/receive (TR) coupler which connects the transmitter and the receiver with the antenna/probe interface 43. The TR-coupler can be a directional coupler, a ferrite circulator, a switch or any other conventional component. The transceiver also includes a pulse width adjuster, as discussed in more detail in the following.

In the case illustrated in FIG. 1a, where the signals are DC pulses, and in some case also when modulated pulses are used, the signal medium interface 43 is connected to a wave guiding structure or probe 4 extending into the content of the tank. The wave guiding structure can be a hollow wave guide or some sort of probe, such as a coaxial wire probe, a twin wire probe, or a single wire probe (also referred to as a surface wave guide). Electromagnetic waves transmitted along the structure 4 will be reflected by any interface between materials in the tank, and the reflection will be transmitted back to the signal medium interface 43.

Alternatively, as shown in FIG. 1b, the signal medium interface 43 is connected to a radar antenna 5, arranged to emit the transmitted waves to freely propagate into the tank, and to receive waves that are reflected by any interface between materials in the tank. In this case, the pulses are typically modulated on a high frequency carrier wave, as illustrated in FIG. 3a. The antenna 5 is arranged inside the tank for transmitting and receiving radar waves into the tank, and a radar wave guide assembly 6 may be arranged for guiding signals between the electronic unit 3 and the antenna 5. The same antenna could preferably be used both as a transmitter for emitting the output radiation and as a receiver for receiving the reflected echo signal, even though it is also possible to use separate antennas for these functions.

In use, the radar level gauge 2 transmits radar energy along the waveguide 5 through the tank roof port and receives reflected energy from the liquid surface(s) to provide an indication of the level of the liquid within the tank. The radar level gauge 2 could be coupled to a remote location (for example a control room) via a signal wire or the like.

A reflection pulse received by the signal medium interface is fed back to the transceiver 41, where it is sampled and digitalized in a process controlled by a processor (not shown). In a pulsed radar level gauge, the distance is calculated by time measurement of the time it takes for a short wave microwave pulse to travel to the target, such as the surface level, and be reflected back to the gauge. For example, a digitalized, sampled time domain reflectometry (TDR) signal based on the reflected signal can be communicated back to the processor 42. This signal can be expanded in time, allowing for use of conventional hardware for conditioning and processing. The processor 42 is preferably provided with software for analyzing the TDR signal in order to determine a process variable in the tank, typically the level of the surface. The processor can also be connected to a user interface, a remote station or the like.

In the schematic situation illustrated in FIG. 1a, the RLG system is arranged to perform measurements of two or more levels of a filling material. In this situation, a highest layer comprises a first material, such as air or any other gas, having a first impedance $\epsilon_0$, an intermediate layer of a second material, such as foam or a liquid of low density, has a second impedance $\epsilon_1$, and a lower layer of a third material, such as gasoline or any other liquid, has a third impedance $\epsilon_2$. Accordingly, two different levels a and b are detectable in this situation.

Figure 2A:
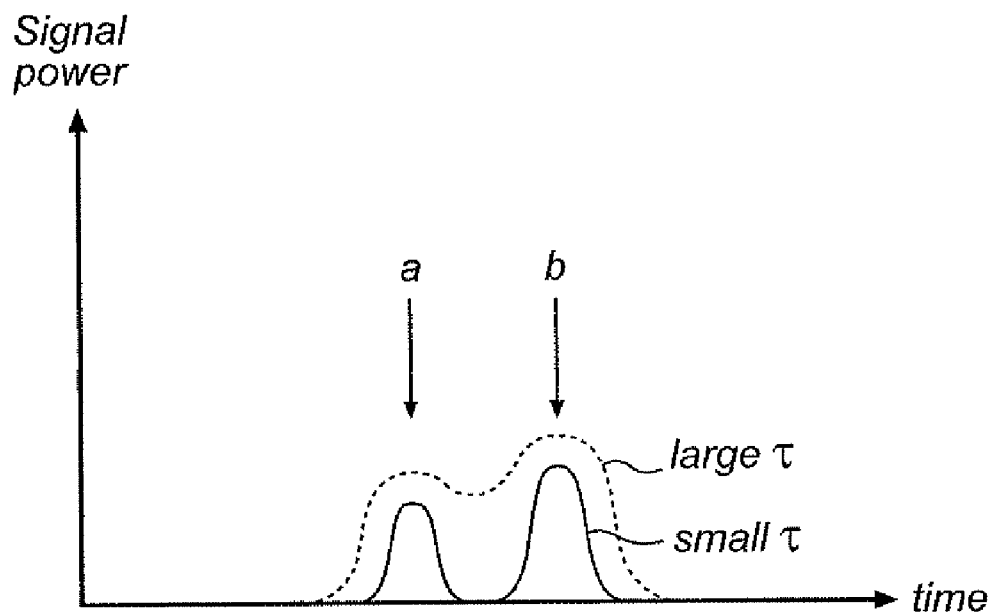
FIGS. 2a and 2b illustrate typical reflected pulse signals receivable in the RLG systems illustrated in FIGS. 1a and 1b, respectively.

However, a general problem in this context resides in the fact that the power of received echoes is dependent on the amplitude of the pulse and the pulse length $\tau$. Accordingly, it is on one hand desirable to use longer pulse lengths in order to amplify weak echoes, so that echoes of higher power can be received. On the other hand, larger pulse lengths decreases the resolution between pulses related to different levels, which makes it more difficult to distinguish between said different levels. This situation is schematically illustrated in the time diagram of FIG. 2a, where echoes resulting from pulses with a smaller $\tau$ result in echoes of lower signal power, but which are clearly distinguishable, whereas a larger $\tau$ results in higher signal power, but where it is difficult, or even impossible, to distinguish between the different levels a and b.

Figure 2B:
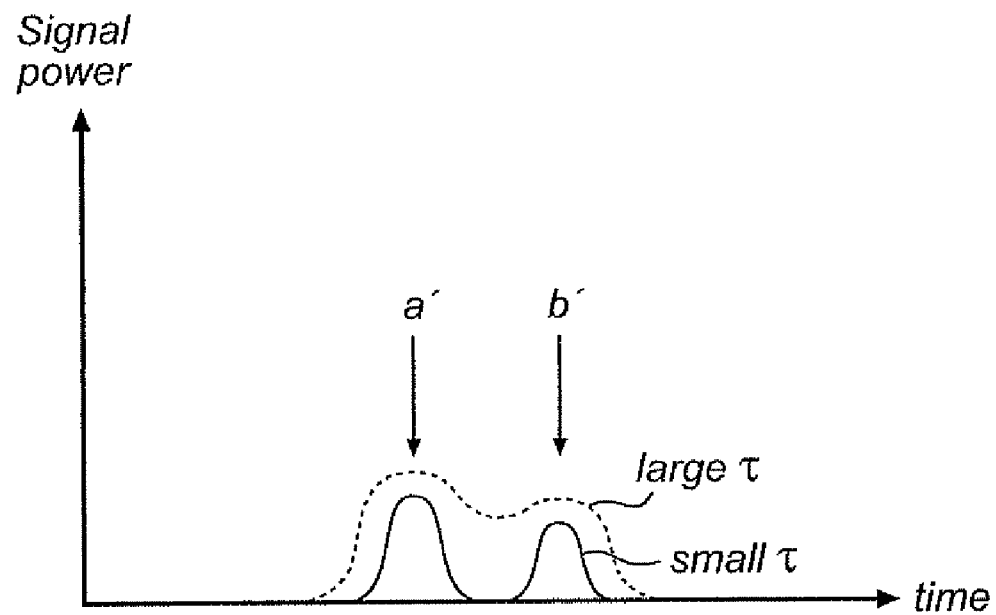

A similar situation is illustrated in FIG. 1b. In this situation, the liquid level is denoted a', and a tank structure, such as a moving stirring device, is arranged on a different level b'. In this situation, a similar problem arises: echoes resulting from pulses with a smaller $\tau$ result in echoes of lower signal power, but which are clearly distinguishable, whereas a larger $\tau$ results in higher signal power, but where it is difficult or even impossible to distinguish between the different levels a' and b', as is illustrated in FIG. 2b.

Thus, the strength of an echo signal is generally equal to amplitude multiplied with pulse time. Consequently, we want to amplify weak echoes with longer pulse times to be able to distinguish these targets. However, resolution decreases with an increased $\tau$ and increases with a decreased $\tau$.

It is therefore in many cases advantageous if the pulse length is adjustable, whereby the pulse length can be adjusted for different environments, operating conditions, intended uses, etc. Accordingly, the RLG further comprises means for controlling the pulse generator for adjusting the pulse width of generated pulses in accordance with at least one application specific condition, as will be discussed more thoroughly in the following. Further, said means for controlling the pulse width are preferably arranged in the pulse forming part of the transceiver circuitry 41, as discussed in the foregoing. An example of a realization of a pulse length adjuster will now be discussed with reference to FIG. 5.

Figure 5:
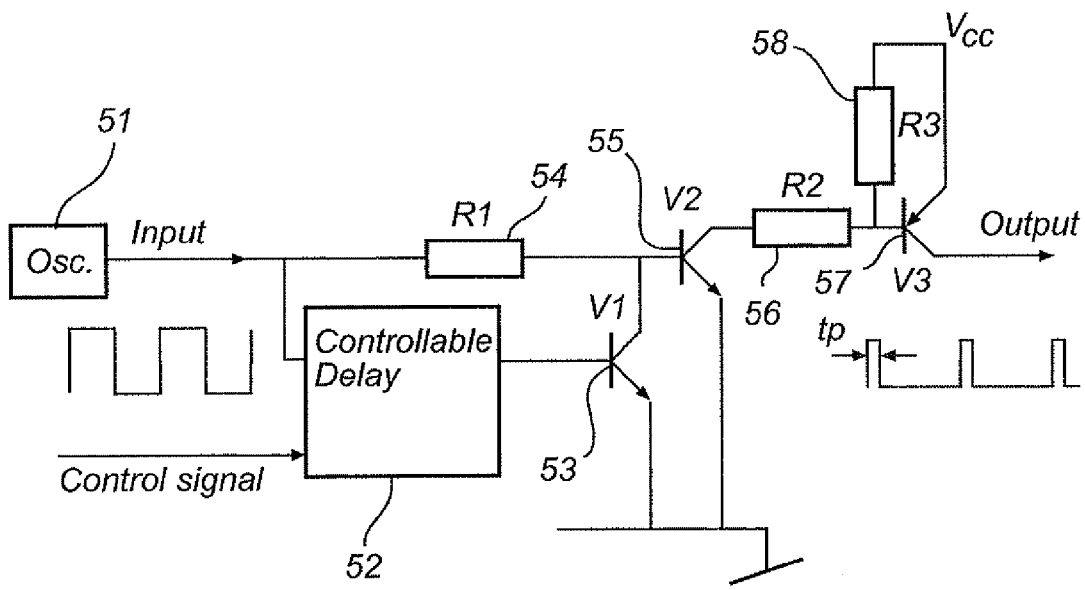
FIG. 5 illustrate an embodiment of a pulse width adjuster, as used in e.g. the transceiver of FIG. 4.

In the exemplary realization of a pulse width adjuster or pulse former, discussed with reference to FIG. 5, there is provided a pulse generator or oscillator 51 for the provision of short DC input clock pulses, which determine the pulse repetition frequency. The input pulses are forwarded via a controllable delay 52 to the base of a first transistor (V1) 53 of npn-type. The delay provided in the controllable delay 52 is adjustable, and controlled by an input control signal. The input clock signal is also forwarded via a first resistance (R1) 54 to the base of a second transistor (V2) 55, also of npn-type, together with an output signal from the collector of the first transistor 53. The emitter of the first and second transistors are connected to ground. The output of the collector of the second transistor is forwarded via a second resistance (R2) 56 to the base of a third transistor (V3) 57, which is of pnp-type. The base and emitter of the third transistor are connected via a third resistance (R3) 58.

The first two transistors provide a positive output signal, interrupted by short pulses, and the third transistor provides an inverse signal, having short positive pulses, and provides an increased output ability of the circuit. The signal to the base of the first transistor 53 is delayed by means of the controllable delay 52. When the input signal at the base of the second transistor becomes high, the second transistor 55 is switched on. At the moment when the voltage to the base of the first transistor 53 reaches a threshold voltage of the transistor, the first transistor shunts the drive voltage to the second transistor. The result is an output signal with the same repetition frequency as the input clock signal, but with a shorter pulse width. The length of the pulse width can be controlled by means of the delay provided by the controllable delay circuit 52, which in turn is dependent on the control signal provided.

Hereby, individual trimming can easily be provided for each pulse forming circuit. Further, the pulse width can easily be electrically adjusted between various working conditions, and consequently changed over time.

The controllable delay 52 may be realized as e.g. a component that controls the threshold of the first transistor or electrically controls a variable resistance, i.e. a potentionmeter, such as a digital potentionmeter arranged ahead of the base of the first transistor.

However, several alternative circuitries are possible for obtaining a controllable pulse width adjustment. For example, the output of the pulse generator may be connected to a fast switch which is controllable to control one or both of the ends of the pulse, thereby to control the pulse length. Other alternatives using variable capacitors and the like are also feasible.

The pulse width may be adjusted for a number of application specific conditions, such as tank height, level of filling material, the presence of several different interface levels, types of materials, different impedances, other tank structure providing reflecting surfaces, type of measurement required, such as general scan, measurement of specific surfaces etc.

It should be noted that a number of variations of the above described embodiments are possible within the scope of the appended claims. For example, all the components of the radar level gauge system described above are not compulsory, but may be excluded or substituted. Also, additional components may be included if and when deemed advantageous. Other types of switches and circuitry components than the above described may be used to realize the invention, as long as they have a satisfactory characteristics and obtain the same functionality. It is also to be appreciated by those versed in the art that various combinations of the above-discussed embodiments are possible. Further, the pulse width may be adaptable in accordance with other application specific conditions than the ones explicitly mentioned in the above embodiments.

Such and other obvious modifications must be considered to be within the scope of the present invention, as it is defined by the appended claims.

What is claimed is:

1. A method for determining filling levels of at least two filling materials in a tank, comprising the steps:
   providing a pulse generator for generation of electromagnetic pulses;
   controlling the pulse width of the generated pulses in dependence of at least one dynamic application specific condition;
   transmitting said pulses with adjusted pulse width from a position above the filling material towards said at least two filling materials;
   receiving reflected echo pulse signals from the tank;
   determining the filling levels of the tank based on said received echo pulse signals;
   wherein one of said at least one dynamic application specific condition(s) is the presence of at least two different interface levels, and
   wherein controlling of the pulse width of generated pulses in accordance with at least one application specific condition is performed automatically and includes:
   controlling the pulse width of generated pulses to be first pulse width in order to determine a presence of at least two filling levels of the tank; and
   controlling the pulse width of generated pulses to be a second pulse width, more narrow than said first pulse width, to distinguish between said different levels.

2. The method of claim 1, wherein the step of controlling comprises adjusting the pulse width for optimizing operation in relation to at least one static application specific condition(s).

3. The method of claim 1, wherein the pulse width is adjusted for at least one application specific condition(s) selected from the group consisting of tank height, level of the filling material, type of filling material, presence of other tank structure providing reflecting surfaces and required accuracy of measurement.

4. The method of claim 1, wherein the pulse width adjustment comprises the sub-steps of:
   controlling the pulse width to at least two different widths;
   determining the filling level of the tank based on said received echo pulse signals using each of said different pulse widths; and
   selecting, based on said determinations of the filling level, one of said pulse widths to be used for subsequent filling level determination.

5. The method of claim 4, wherein the step of controlling the pulse width to different widths and determining the filling level for each of said different pulse widths are repeated to perform a scanning among a multitude of different pulse widths.

6. The method of claim 1, wherein said pulse is a modulated pulse.

7. A radar level gauge system for determining filling levels of at least two filling materials in a tank, comprising:
   a transmitter for generating and transmitting an electromagnetic transmitter pulse signal, wherein the transmitter comprises a pulse generator and means for pulse width adjustment;
   a transmitter controller for controlling the means for pulse width adjustment for adjusting the pulse width of the transmitter pulse signal in dependence of at least one application specific condition;
   a signal medium interface connectable to means for directing said transmitter pulse signal from a position above the filling material towards said at least two filling materials and for receiving a reception pulse signal reflected back from said filling material;
   a receiver for receiving said reception pulse signal from the tank;
   processing circuitry for determining the filling levels of the tank based on said reflection pulse signal received by said receiver;
   wherein the transmitter controller is arranged to automatically control the pulse width of generated pulses in accordance with the at least one dynamic application specific condition;
   wherein one of said at least one dynamic application specific condition(s) is the presence of at least two different interface levels, and
   wherein the transmitter controller is arranged to control the pulse width of generated pulses to be first pulse width in order to determining presence of at least two filling levels of the tank; and to control the pulse width of generated pulses to be a second pulse width, more narrow than said first pulse width, to distinguish between said different levels.

8. The radar level gauge system of claim 7, wherein the transmitter controller is arranged to control the pulse width to adjust the width of the transmitter pulse signal for optimizing operation in relation to at least one static application specific condition(s).

9. The radar level gauge system of claim 7, wherein the transmitter controller is arranged to adjust the pulse width in accordance with at least one application specific condition(s) selected from the group consisting of tank height, level of the filling material, type of filling material, presence of other tank structure providing reflecting surfaces and required accuracy of measurement.

10. The radar level gauge system of claim 7, wherein the transmitter controller is arranged to control the pulse width to at least two different widths, and selecting, based on determinations of the filling level of the tank based on received echo pulse signals using each of said different pulse widths, one of said pulse widths to be used for subsequent filling level determination.

11. The radar level gauge system of claim 10, wherein the transmitter controller is arranged to control the pulse width to vary over time so that a scanning is made among a multitude of different pulse widths.

12. The radar level gauge system of claim 7, wherein the means for directing the transmitter pulse signal towards the filling material comprises an antenna.

13. The radar level gauge system of claim 7, wherein the means for directing the transmitter pulse signal towards the filling material comprises a probe.

14. The method of claim 7, further comprising means for modulating the pulse.

* * * * *